United States Patent [19]

Hasegawa et al.

[11] 3,714,878
[45] Feb. 6, 1973

[54] SINGLE-LENS REFLEX CAMERA HAVING INTERCHANGEABLE LENSES

[75] Inventors: Goro Hasegawa, Fuchu-shi, Tokyo; Yukio Iura, Kawasaki-shi, Kanagawa-ken, both of Japan

[73] Assignee: Canon Kabushiki Kaisha, Tokyo, Japan

[22] Filed: Nov. 30, 1970

[21] Appl. No.: 93,787

[52] U.S. Cl. ........................95/42, 95/10 C, 95/64 D
[51] Int. Cl. ..............................................G03b 19/12
[58] Field of Search ......................95/10 C, 64 D, 42

[56] References Cited

UNITED STATES PATENTS

| 3,043,202 | 7/1962 | Hahn | 95/10 C |
|---|---|---|---|
| 3,077,153 | 2/1963 | Gopfert | 95/64 D |
| 3,470,805 | 10/1969 | Suzuki et al. | 95/42 |

Primary Examiner—Samuel S. Matthews
Assistant Examiner—E. M. Bero
Attorney—Anton J. Wille

[57] ABSTRACT

A single lens reflex camera having interchangeable lenses, an exposure meter capable of carrying out photometering of the light through a phototaking lens according to the system of the lens attached. A sliding cam plate is movable to a position corresponding to a preset value of a diaphragm aperture by the engagement of an interchangeable lens with a preset pin. A rocking lever is engageable with the sliding cam plate for positioning at a predetermined location in accordance with the location of the preset pin for adjusting the exposure meter to open aperture photometry, and a sliding member is operatively engageable with an aperture setting pin of the lens. A setting lever is connected to the sliding member for setting the aperture to a preset value, a portion of the setting member being engageable with the rocking lever when the setting lever is actuated to set the exposure, thereby to pivot the rocking lever for adjusting the exposure meter to open aperture photometry. A warning member in operative association with the rocking lever is movable between a warning range and a photometry range.

5 Claims, 7 Drawing Figures 3,714,878

SINGLE-LENS REFLEX CAMERA HAVING INTERCHANGEABLE LENSES

BACKGROUND OF THE INVENTION

The present invention relates to a single-lens reflex camera of the type having a so-called TTL exposure meter which determines the optimum aperture stop by measuring the quantity of light passed through a picture taking lens, and being capable of selecting either the exposure setting with stop down or the exposure setting at maximum aperture, depending upon the interchangeable lens being used.

The single-lens reflex camera of the type described is provided with means for engagement with a preset pin of the lens for transmitting a preset aperture stop to an exposure meter, when there is mounted an interchangeable lens of the type requiring exposure setting at maximum aperture. Means are also provided for closing down the aperture blades to a preset aperture stop when there is mounted an interchangeable lens of the type requiring exposure setting with the stop down. Therefore, when the aperture setting device is erroneously operated when using the lens of the type requiring exposure setting at maximum aperture, the exposure meter may be adjusted twice, thereby causing erratic exposure.

SUMMARY OF THE INVENTION

It is therefore the primary object of the present invention to provide a single-lens reflex camera of the type described with a mechanism for giving a warning of erratic operation of an aperture setting lever when using an interchangeable lens of the type requiring exposure setting at maximum aperture is mounted.

The present invention will become more apparent from the following description of the preferred embodiments thereof, taken in conjunction with the accompanying drawings.

DESCRIPTION OF THE PREFERRED EMBODIMENTS

Figure 1:
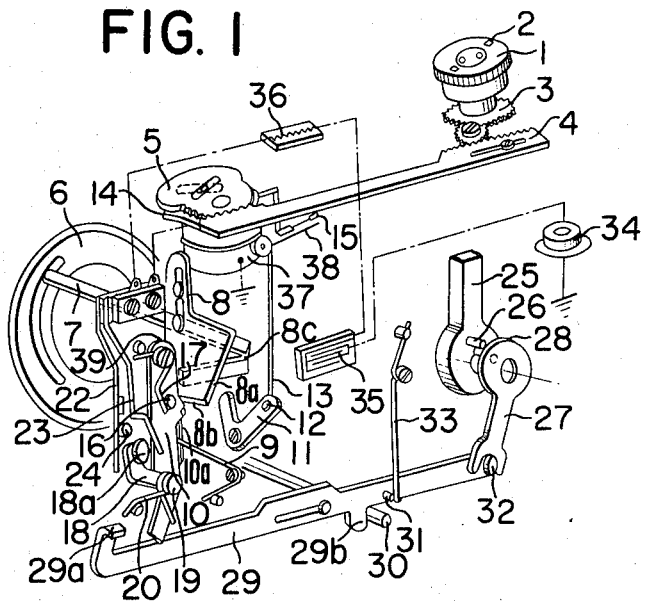
FIG. 1 is a perspective view of a first embodiment of the present invention.

The first embodiment of the present invention utilizes a pointer in an exposure meter as a warning member. Referring to FIG. 1, a film speed or sensitivity setting dial 2 is coaxially fixed to a shutter dial 1. A gear 3, coaxially fixed to the shutter dial 1, is drivingly coupled to a pointer cam 5 through a rack 4. Another cam 14, having a following pointer 15, is coaxially placed over the cam 5 and is operatively coupled thereto through the conventional pin-and-slot coupling. The cam 14 is further operatively coupled through a belt or string 13 to a bell crank 11 which is actuated in response to a preset aperture stop so that the pointer 15 may swing in response to the shutter speed, film sensitivity and the aperture stop. A meter 37, disposed below the following pointer driving mechanism constitutes an exposure meter circuit together with an electric power source 34, a photosensitive element 35 and a resistor 36. A pointer 38 of the meter 37 rotates about the same axis as the following pointer 15. The exposure meter circuit is provided with a switch comprising contacts 22 and 23 to be described in more detail hereinafter.

Reference numeral 6 designates the rear portion of an interchangeable lens; and 7 designates a preset pin extending from a preset ring (not shown) of an interchangeable lens of the type requiring exposure setting at maximum aperture. This pin is adapted to engage an arm 8c of a cam 8, which is slidable over the side surface of a mirror box (not shown). The cam 8 has a cam surface 8a for engagement with one arm of the bell crank 11. The cam 8 also has a cam surface 8b for engagement with a projection 10a of a lever 10 which is pivotably fixed to the camera body by a pin 39 and normally so biased by a spring 17 as to rotate in a counterclockwise direction until it engages the surface 8b. An auxiliary lever 18 is rotatably mounted by a pin 19 on the lever 10 and is normally biased for rotation in a clockwise direction by a spring 20 until a projection on the back side of the lever 18 engages the side surface of the lever 10. An upright projection 18a extending from one end of the lever 18 is adapted to open or close contacts 22 and 23 of the exposure meter circuit. The contacts 22 and 23 are biased towards closure. The contact 22 is held in its normal position by a stopper 24. The projection 18a engages contact 23 to open the circuit. The cam 8 is biased upwardly by a spring 9.

An aperture setting lever 25 is disposed on the front side of the camera body and is operatively coupled to a lever 27 for coaxial rotation therewith through pins 26 and 28. The lever 27 is placed inside the camera body behind the front wall of the camera body. The lever 27 is in engagement with a pin 32 extending from a sliding lever 29. A projection 29b of the sliding lever 29 is in engagement with an aperture setting pin 30 of a lens. The sliding lever 39 is normally biased to the left as viewed in FIG. 3, by a spring 33.

Figure 2:
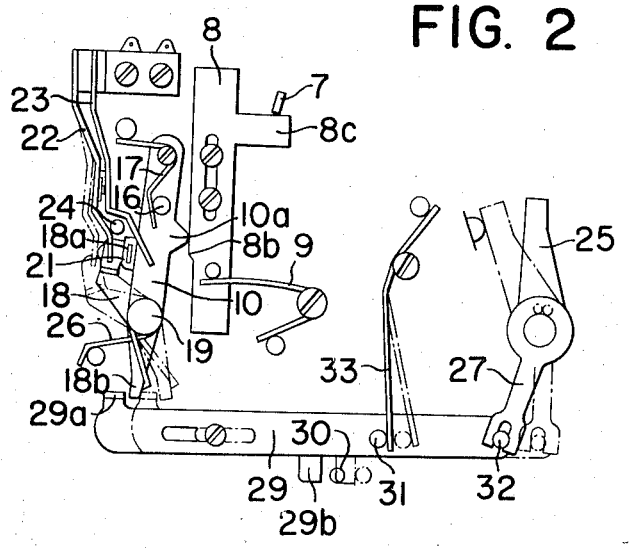
FIG. 2 is a diagrammatic view showing the mode of operation when using an interchangeable lens of the type requiring exposure setting at maximum aperture.
Figure 3:
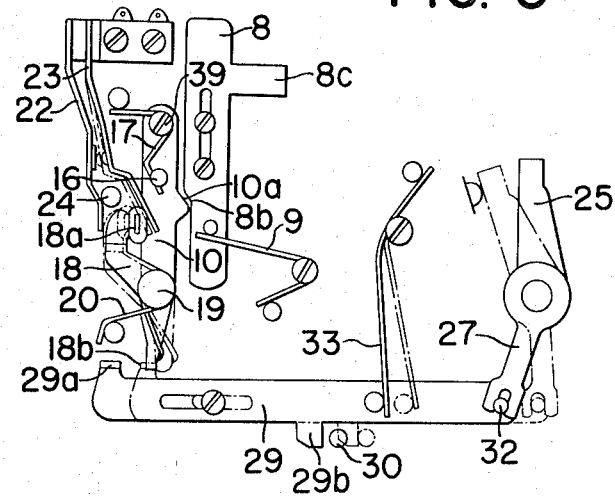
FIG. 3 is a view similar to FIG. 2, but showing the mode of operation of an interchangeable lens of the type requiring an exposure setting with the stop down.

The make and break operations of the contacts of the switch when the interchangeable lenses are mounted, are illustrated in FIGS. 2 and 3 in which the cam surface 8a of the cam 8 is not shown in order to clearly show other component parts.

When using an interchangeable lens of the type requiring exposure setting at maximum aperture, the preset pin 7 engages the arm 8c of the cam 8 so as to cause the cam 8 to move down against the spring 9. Consequently, the cam surface 8b pushes the projection 10a so that the lever 10 is caused to rotate about its pivot 39 in a clockwise direction. When this occurs the auxiliary lever 18 moves to the left with the lever 10 so that the normally open contact 23 moves into engagement with the contact 22 to close the exposure meter circuit as indicated by the solid lines in FIG. 2, and hence the pointer of the meter swings in response to the brightness of the subject. When the diaphragm aperture is fully open and the preset ring (not shown) is rotated, the preset pin 7 is displaced in response to an aperture stop setting so that the cam 8 is caused to move. Consequently, the cam 14 is rotated, through the bell crank 11 and the belt 13, so that the following pointer 15 rotates until it coincides with the pointer 38 for setting an optimum stop.

When using the lens of the type requiring exposure setting at maximum aperture, the exposure meter circuit is automatically closed in the manner described above. However, when the aperture setting lever is erroneously operated, the aperture is set to a preset aperture stop by displacing the sliding lever 29, connected to the lever 25 to actuate the lens aperture setting pin 30, wherein the quantity of light incident upon the photosensitive element is decreased, thereby causing an erratic exposure setting. Therefore, in order to avoid this result, the present invention provides a preventive means. That is, is, when the aperture setting lever is erroneously operated, the exposure meter circuit is again opened so that the exposure setting becomes impossible. This arrangement will be described in more detail hereinafter.

When the lever 25 is rotated in the counterclockwise direction as indicated by the chain lines in FIG. 2, the sliding lever 29 is displaced toward the right so that the pin 30 is also displaced toward the right. When the aperture stop is closed down, the projection 29a on the left end of the sliding lever 29 engages the lower end 18b of the auxiliary lever 18 so as to rotate it in a counterclockwise direction against the spring 20. The upright projection 18a pushes the contact 22 toward the left, as indicated by the broken line in FIG. 2, to thereby open the exposure meter circuit. The pointer 38 returns to its original position thereby giving a warning.

Next, the mode of operation of an interchangeable lens of the type requiring an exposure setting with the stop down, will be described. With this type of lens there is no preset pin for engagement with the cam 8 so that the cam is moved upwardly by the spring 9 and positioned, as shown in FIG. 3. The stepped side surface of the cam 8 contacts the projection 10a of the lever 10 to retain the lever 10 at a position so that the upright projection 18a of the lever 18 displaces the contact member 23 with respect to contact member 22, thereby to open the exposure meter circuit. Thus, the pointer 38 of the exposure meter remains in its original position.

When the aperture setting lever 25 is rotated in the counterclockwise direction, the sliding lever 29 is moved toward the right against the spring 33 so that the aperture blades are set to a present value through the aperture setting pin 30. Then, the projection 29a engages the auxiliary lever 18 to rotate it counterclockwise, but in this case the pivot 19 is displaced rightwardly so that the upright projection 18a does not engage the contact 22. However, the contact 23 because of its resiliency follows the upright projection 18a to the left and thereby engages the contact 22 to close the exposure meter circuit. Thus the pointer 38 of the exposure meter swings.

In this case, the following pointer 15 remains in a position which is determined by the shutter speed and the film sensitivity so that the preset ring may be rotated so as to change the aperture stop to coincide the pointer 38 of the meter with the following pointer 15.

From the foregoing description it is seen that when using an interchangeable lens of the type requiring exposure setting at maximum aperture, the exposure meter circuit is closed so that the photocurrent flows through the exposure meter for exposure setting. When the lever 25 is erroneously operated, the exposure meter circuit is opened to prevent the exposure setting with stop down. On the other hand when using other types of interchangeable lenses, the exposure meter circuit remains opened. Only when the aperture setting lever 25 is operated is the exposure meter circuit closed so as to permit the exposure setting with the stop down.

Next, the second embodiment of the present invention will be described. In brief, in this embodiment both the pointer of the meter and the following pointer may be viewed through a viewfinder and then the erratic operation occurs, the following pointer swings to a warning mark to thereby give a warning, instead of opening the exposure meter circuit.

Figure 4:
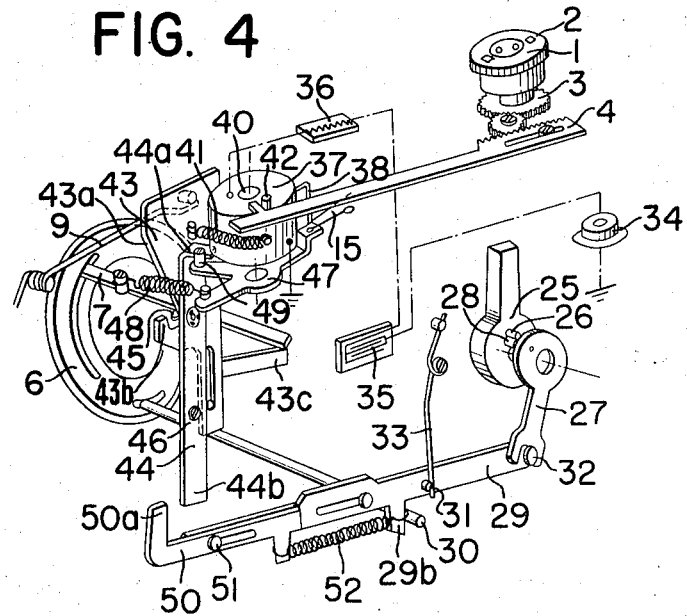
FIG. 4 is a perspective view of a second embodiment of the present invention.

As viewed in FIG. 4, the meter 37 is rotatably carried by a shaft 40 and carries a pin 42 which engages the rack 4. The meter is rotated in response to the shutter speed and film sensitivity. The meter 37 is normally biased by a spring 41 to return to its original position. A lever 47, carrying the following pointer 15 is disposed below the meter 37 for coaxial rotation with the pointer of the meter. This lever is normally so biased as to rotate in the clockwise direction by a spring 48.

Figure 5:
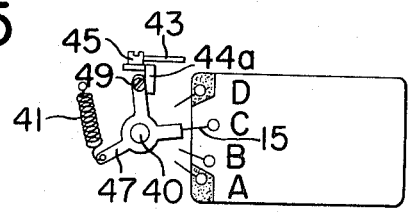
FIG. 5 is a view illustrating the positions of a following pointer within the field of view of a viewfinder.

A pin 49 extending from one arm of the lever 47 is in engagement with the upper end 44a of a rocking lever 44 which is pivotally fixed to the camera body by a pin 46. A pin 45, extending from the lever 44 above its pivot 46, engages a cam surface 43a of a cam 43. The arm 43c of the cam 43 is in engagement with the preset pin 7 when using an interchangeable lens of the type requiring exposure setting at maximum aperture, as in the case of the first embodiment so that the cam 43 is moved downwardly against the spring 9. Therefore, the cam surface 43a pushes the pin 45 downwardly so that the lever 44 is caused to rotate about the pin 46 in a counterclockwise direction. The upper end 44a of the lever 44 pushes a pin 49 so as to cause the following pointer lever 47 to rotate about the shaft 40 against a spring 48. In this case, the following pointer 15 is located at B in FIG. 5, which is the starting point of the photometry range.

Figure 6:
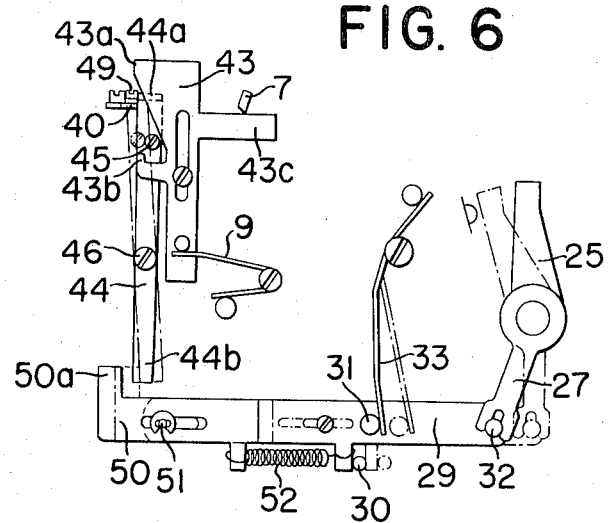
FIG. 6 is a diagrammatic view of the mode of operation of a vertically movable member of the second embodiment when using an interchangeable lens of the type requiring exposure setting at maximum aperture.

Upon rotation of the preset ring, the pin 7 is displaced so that the following pointer 15 is rotated so as to follow the pointer 38 for exposure setting at maximum aperture. When the aperture setting lever is erroneously operated, the sliding lever 29 is displaced as indicated in FIG. 6 so as to actuate the aperture blades. In this case one end 50a of a connecting member 50, connected to the sliding lever 29 through a spring 52, is engaged with the lower end 44b of the lever 44, as indicated by the chain lines in FIG. 6, so as to rotate the lever 44 in counterclockwise direction. The upper end 44a of the lever 44 pushes the pin 49 of the following pointer lever 47 so that the following pointer 15 is rotated against the spring 41 in a counterclockwise direction to the warning mark in the viewfinder, thereby giving a warning of the erratic operation, as indicated at D in FIG. 5.

Figure 7:
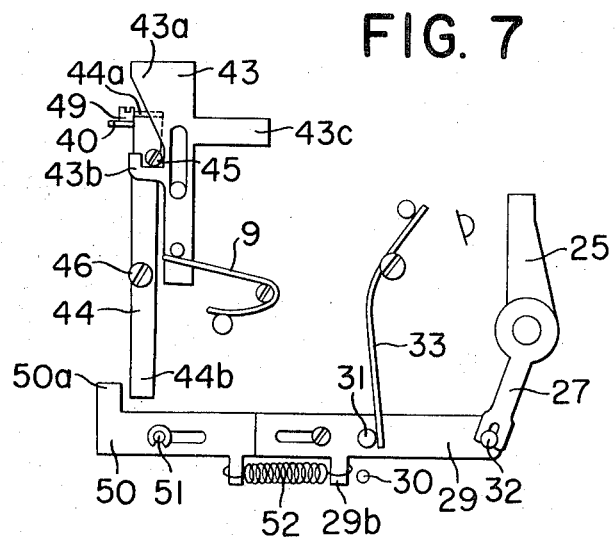
FIG. 7 is a view similar to FIG. 6 but when using an interchangeable lens of the type requiring an exposure setting with the stop down.

When using an interchangeable lens of the type requiring in exposure setting with the stop down, the arm 43c of the cam 43 is free, because the lens has no preset pin and the sliding lever 43 is held in its upper position under the force of the spring 9. In this case, even when the preset ring is rotated, the following pointer will not be rotated, but remains at the warning mark A in FIG. 5 to thereby give a warning that the aperture setting lever must be operated. When the lever 25 is rotated in a counterclockwise direction, the sliding lever 29 is displaced to the right so that one end 50a of the connecting member 50 engages the lower end 44b of the lever 44 so as to rotate it in a counterclockwise direction. This rotation is stopped when the pin 45 engages the arm 43b of the cam 43 as indicated in FIG. 7. Thereafter only the sliding lever 29 is moved toward the end of its stroke, while expanding the spring 52, so as to set the aperture to a preset value, and the pointer 38 of the meter 37 swings, accordingly. In this case, the following pointer 15 remains in the position B, FIG. 5. When the preset ring is rotated while the aperture setting lever remains inclined, the pointer 38 swings until it coincides with the following pointer 15. Thus the optimum aperture stop is determined.

In the second embodiment, the following pointer swings to the warning mark in the viewfinder when the erratic operation occurs. The warning mark is preferably a red-colored transparent mark. However, in one variation the pointer may be so arranged as to swing out of the field of view of the viewfinder when the erratic operation occurs.

In brief, according to the present invention, a preset connecting pin, extending from a preset ring of an interchangeable lens of the type requiring exposure setting at maximum aperture engages a vertically movable cam on the side of a camera body. A lever operatively coupled to this cam serves to close the exposure meter circuit or to swing the following pointer in the field of view of the viewfinder for accomplishing the exposure setting at maximum aperture. For the exposure setting with stop down when using an interchangeable lens of the type having no preset pin, the aperture setting lever is operatively coupled to the rocking lever, through the sliding lever for exposure setting, so that the rocking lever may be rotated by the aperture setting lever. When using an interchangeable lens of the type requiring exposure setting at maximum aperture, the exposure meter circuit is closed or the pointer swings to the warning mark position or out of the field of view of the viewfinder when the aperture setting lever is operated, thereby giving a warning of the erratic operation. Thus, there is provided a TTL single-lens reflex camera which may set an optimum aperture without any erratic operation with either of the interchangeable lenses described hereinbefore.

What is claimed is:

1. In a single lens reflex camera, attachable with different kinds of interchangeable lenses and provided with an exposure meter capable of carrying out photometering of the light through a phototaking lens according to the system of the lens attached, the combination comprising
   aperture preset value transmitting means for transmitting a preset aperture value to said exposure meter when interlocked with an aperture value preset member of said interchangeable lens,
   aperture setting means for setting the aperture of said interchangeable lens in manual operation,
   deflection means deflectable by the engagement with said aperture preset value transmitting means and with said aperture setting means,
   warning means interlocked with said deflection means,
   a warning member movable between a warning range and a photometry range by said warning means, said deflection means being deflected to its position for locating the warning member within said photometry range when actuated by either said aperture preset value transmitting means or said aperture setting means, said deflection member being deflected to its position for locating the warning member within said warning range when actuated by both said aperture preset value transmitting means and said aperture setting means.

2. Apparatus according to claim 1 wherein said warning member is a pointer in said exposure meter.

3. Apparatus according to claim 2, wherein said deflection means includes a pair of pivotally mounted levers, said aperture preset value transmitting means includes a cam plate, said aperture setting means includes a sliding member, said exposure meter includes an electric circuit, and said warning means includes electrical contacts in said electric circuit, whereby said pair of pivotally mounted levers are deflected to their positions for closing said contacts when actuated by either said cam plate or said sliding member, and said pair of pivotally mounted levers are deflected to their positions for opening said contacts when actuated by both said cam plate and said sliding member.

4. Apparatus according to claim 2, wherein said deflection means includes a rocking lever, said aperture preset value transmitting means includes a cam, said aperture setting means includes a sliding member, said warning means includes a following pointer lever, and said warning member includes a following pointer, whereby said rocking lever is deflected to its position for locating said following pointer within said photometry range when actuated by either said cam or said sliding member, and said rocking lever is deflected to its position for locating said following pointer within said warning range when actuated by both said cam and said sliding member.

5. Apparatus according to claim 1, wherein said warning member is a following pointer, and wherein said following pointer is rotatably supported to follow the movement of a meter pointer in said exposure meter within the photometry range responsive to the preset value of said aperture value preset member when engaging said aperture preset value transmitting means to move said deflection means, and wherein said following pointer moves into the warning range beyond the photometry range when said aperture setting means is actuated and when said aperture value preset member is in engagement with said aperture preset value transmitting means.

* * * * *